United States Patent [19]
Collin

[11] Patent Number: 5,987,874
[45] Date of Patent: Nov. 23, 1999

[54] METHOD AND APPARATUS FOR POWER GENERATION BASED ON CHAR AND A FLUIDIZED BED REACTOR

[75] Inventor: Per Collin, Stocksund, Sweden

[73] Assignee: Nykomb Synergetics Technology Holding AB, Stockholm, Sweden

[21] Appl. No.: 08/952,484
[22] PCT Filed: May 20, 1996
[86] PCT No.: PCT/SE96/00654
 § 371 Date: Dec. 8, 1997
 § 102(e) Date: Dec. 8, 1997
[87] PCT Pub. No.: WO96/36791
 PCT Pub. Date: Nov. 21, 1996

[30] Foreign Application Priority Data

May 19, 1995 [SE] Sweden ................................ 9501886

[51] Int. Cl.[6] .............................. F02B 43/00; F02C 6/00; F01K 23/06
[52] U.S. Cl. ...................... 60/39.02; 60/39.12; 60/39.182
[58] Field of Search ................................ 60/39.02, 39.12, 60/39.182, 39.464; 110/245

[56] References Cited

U.S. PATENT DOCUMENTS

| | | | |
|---|---|---|---|
| 4,338,788 | 7/1982 | Fink | 60/39.02 |
| 4,508,041 | 4/1985 | Voetter et al. | 110/245 |
| 4,655,147 | 4/1987 | Brannstrom et al. | 60/39.464 |
| 5,099,801 | 3/1992 | Scholl et al. | 110/245 |
| 5,241,825 | 9/1993 | Collin et al. | 60/655 |
| 5,255,507 | 10/1993 | Gounder | 60/39.12 |
| 5,327,726 | 7/1994 | Daman et al. | 60/648 |
| 5,469,698 | 11/1995 | Garcia-Mallol et al. | 60/39.12 |
| 5,765,365 | 6/1998 | Fujioka et al. | 60/39.12 |

*Primary Examiner*—Ted Kim
*Attorney, Agent, or Firm*—Young & Thompson

[57] ABSTRACT

A method and apparatus for power generation based on char includes partial combustion of char with preheated air in a flow of recirculated bed material; final combustion of the partially burned material in a flow of bed material; separation of the products of the final combustion in a separator which delivers bed material to an intermediary vessel and gas to the gas turbine combustion chamber; recirculation of bed material to the combustion steps via the intermediary vessel, where it is cooled and divided into two flows; preheating of air from the gas turbine compressor, which has been divided into two flows by mixing the air with bed material from the intermediary vessel; generation of electric power in a combine cycle with a gas turbine with reheated gas from the separator, and a steam turbine; and recovery of heat from the turbine exhaust gases for use in the steam cycle.

14 Claims, 2 Drawing Sheets

METHOD AND APPARATUS FOR POWER GENERATION BASED ON CHAR AND A FLUIDIZED BED REACTOR

This application is a 371 of PCT/SE96/00654 filed May 20, 1996.

BACKGROUND OF THE INVENTION

The present invention relates to a method and apparatus for power generation based on char.

DESCRIPTION OF THE RELATED ART

In recent years a number of systems have been suggested for power generation based on sub-bituminous and bituminous coals according to which the coal is combusted in two steps: a first partial combustion step with an understoichiometric air ratio and a final combustion step with excess air. Both steps work with overpressure and with gases being produced. Low Btu gas from the first step and flue gases from the second are utilized in a combined cycle with gas as well as a steam turbine. Such a system is described in the conference notes from the EPRI Conference on Fluidized Bed Combustion for Power Generation, Atlanta, May 17–19, 1994 titled "PFBC Perspectives at the Power Systems Development Facility".

In that system there is described the use of raw material, e.g., coal of all types, in dry powdered state being fed into a pressurized carbonizer, where about 70% of the coal is combusted with air (partial combustion) in a fluidized bed at about 925° C. in presence of a sulphur sorbent and is transformed to low Btu gas and char. The latter is combusted with excess air in a pressurized circulating fluidized bed ("PCFBC") at about 850° C. in the presence of sulphur sorbent. Produced flue gas, after dust cleaning, is fed to the combustor of a gas turbine, in which the temperature of the gas is increased by combustion in mixture with the low Btu gas from the carbonizer "topping". After power generation in the gas turbine, the heat content of the flue gases is utilized in a steam generator for production of steam. The steam is utilized for power generation in a steam turbine. The temperature in the PCFBC must be controlled within a rather narrow interval to bring about effective sulphur fixation to the sorbent, which is accomplished by built-in heat exchangers, working as once through steam generators, in the bed material circulation cycle of the PCFBC.

SUMMARY OF THE INVENTION

An object of the present invention is to provide an improved power generation system and method utilizing a system with devices for power generation based on char, preferably char from a pyrogas generator according to patent SE-9200989-3. The invention is described below in more detail in a manner which will be appreciated by one of skill in the art.

The system according to the invention works in a combined cycle with steam and gas turbines and suitably at a pressure, which by a few bar exceeds the admission pressure of the system's gas turbine. Further, the invention provides a combination of seven operations which follow.

1. Partial combustion of char in a first step at 750–850° C. with greater than 500° C., preferably about 600° C., preheated air in a bubbling spouting fluidized bed in the presence of a flow of bed material (char ash and reaction products of the sorbent), the flow of bed material being greater than 20 times the flow of char.

2. Final combustion in a second step at about 850° C. and with a large excess of air suitably corresponding to greater than three times the theoretical air ratio for complete combustion, of the first step formed carbon monoxide and unburned char, greater than 500° C., preferably about 600° C. preheated air is provided in the presence of a flow of bed material greater than 40 times the flow of the char.

3. Separation in a gas cleaning unit at high temperature of bed material and gas in the suspension from the final combustion step and delivering: the separated material to an intermediate multi-function container, and the cleaned gas to the gas turbine of the system.

4. Recirculation of bed material from the gas cleaning unit via the intermediate container to the combustion steps, where an adapted utilization of the heat content of the bed material by heat exchanging and splitting of the bed material flow into two partial flows are accomplished.

5. Preheating to greater than 500° C. and preferably to about 600° C. the pressure enforced and in two partial flows split air flow from the system's gas turbine compressor by admixture of respective part flow of compressed air to the part flows of hot bed material from the intermediate container.

6. Power generation in a combined cycle with gas and steam turbines based on the gas from the gas cleaning unit after adapted temperature increase, whereby the steam cycle preferably works with steam of high pressure and superheating respectively reheating to high temperature by heat exchanging with hot bed material in the intermediate container.

7. Recuperation of heat from the flue gases from the system's gas turbine in a steam generator of conventional design and utilization of produced steam in the steam cycle of the system.

A system according to the present invention utilizing a combination of above described operations has, among others, the following advantages:

Low content of NOX in the gas to the gas turbine combustor owing to strongly reduced atmosphere in the partial combustion step and the presence of, in relation to the flow of char, a large flow of recirculating bed material holding substances which have a strong catalyzing effect on the decomposition of NOX in the reducing atmosphere.

High total burnout (>99%) in the final combustion step of unburned char from the partial combustion step owing to very high excess of well preheated combustion air. Low new formation of NOX by elimination of high local temperatures and high concentrations of catalytically acting bed material with moderate temperature in the near vicinity of the char particles.

Very good $SO_2$ elimination in the gas from the final combustion step at a CaO/S molar ratio in the char=1.5–2.5 based on the organically fixed sulphur of the char. The bed material tapped from the system holds all fixed sulphur as gypsum and in the case where the char is derived from a pyrogas generator according to patent SE-9200980-3, the sulphur of the original coal fixed to the sorbent in the generator is refound as gypsum in the bed material tapped from the final combustion step. This is not the case in some other systems, according to which tapped bed material has to be oxidized in a special apparatus in order to prevent the smell of hydrogen sulfide when dumped.

Very good temperature control at macro-system level as well as a micro-system level owing to heavy recirculation of bed material enabling continuous low emission of nitrogen and sulphur oxides in presence of low admixture of sorbent. Particularly low nitrogen oxide emission from the steam generator after the gas turbine can be achieved by adapted addition of steam to its combustion chamber in a per se known manner.

PREFERRED EMBODIMENT OF THE INVENTION

Figure 1:
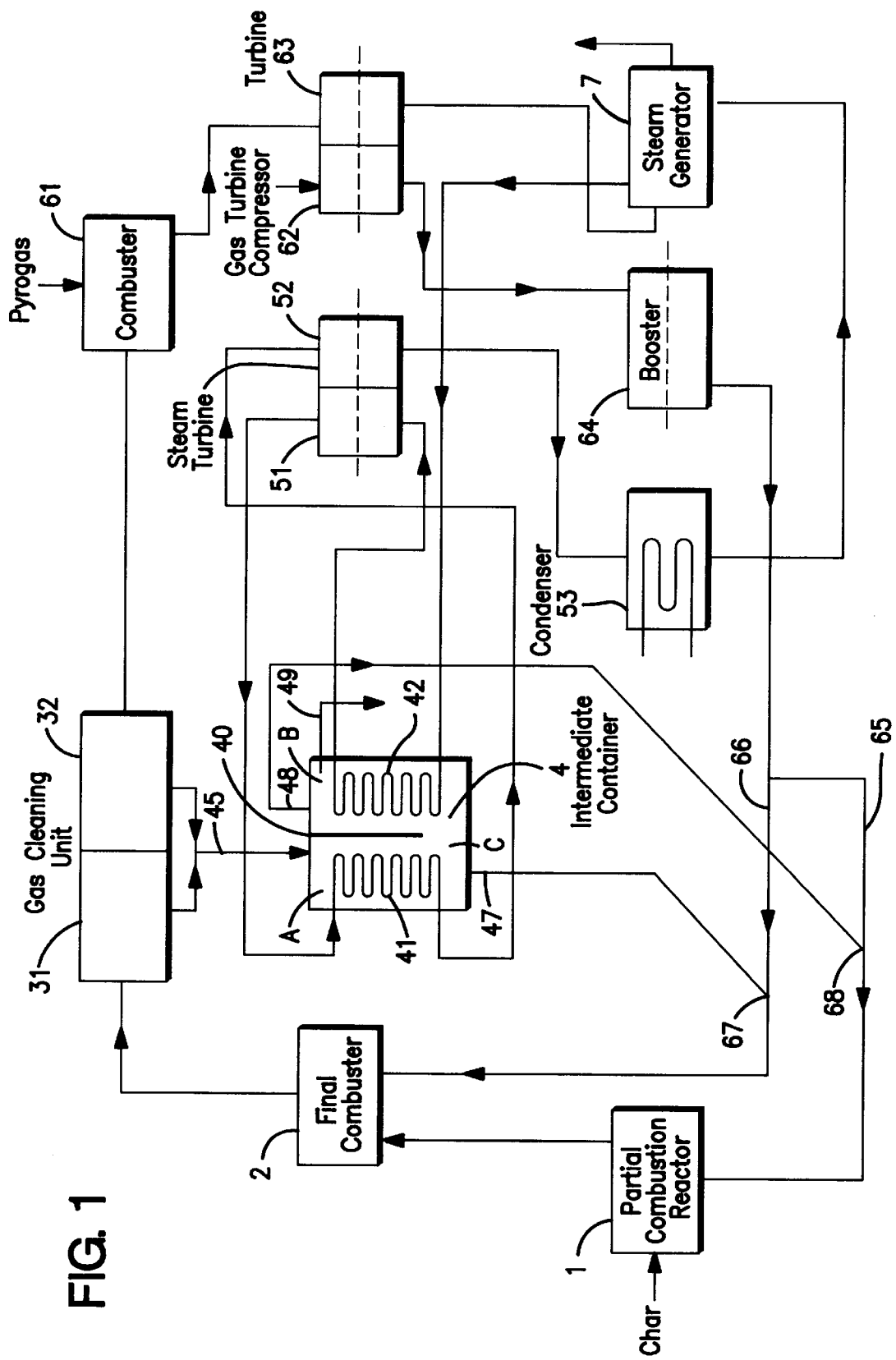
FIG. 1 is a power generator block diagram according to the invention.
Figure 2:
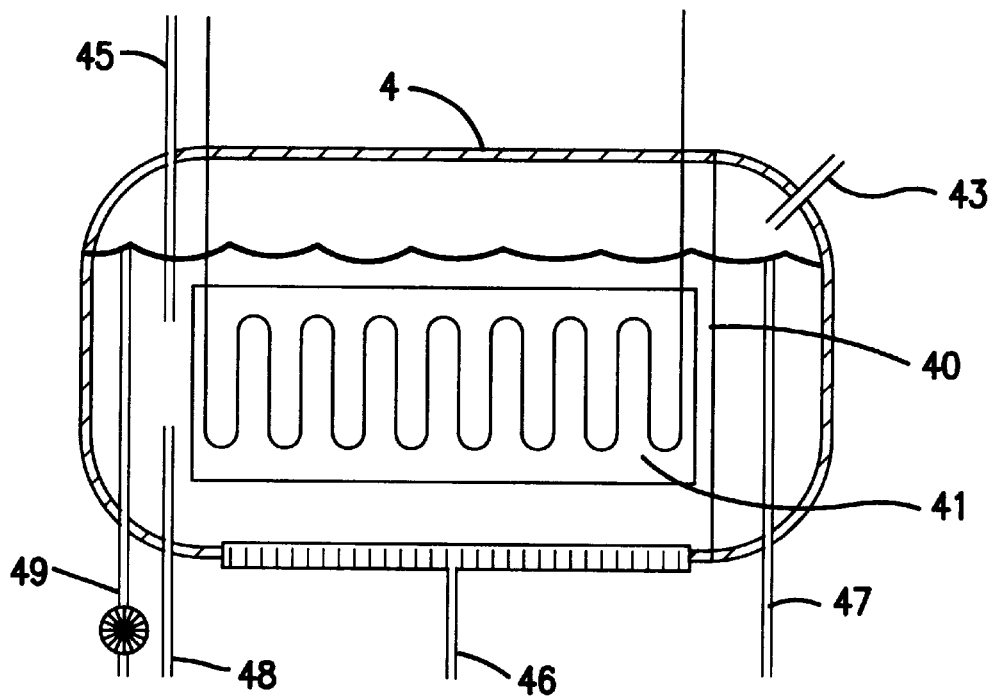
FIG. 2 shows vertical and horizontal sections of a multi-functional intermediate container.
Figure 2:
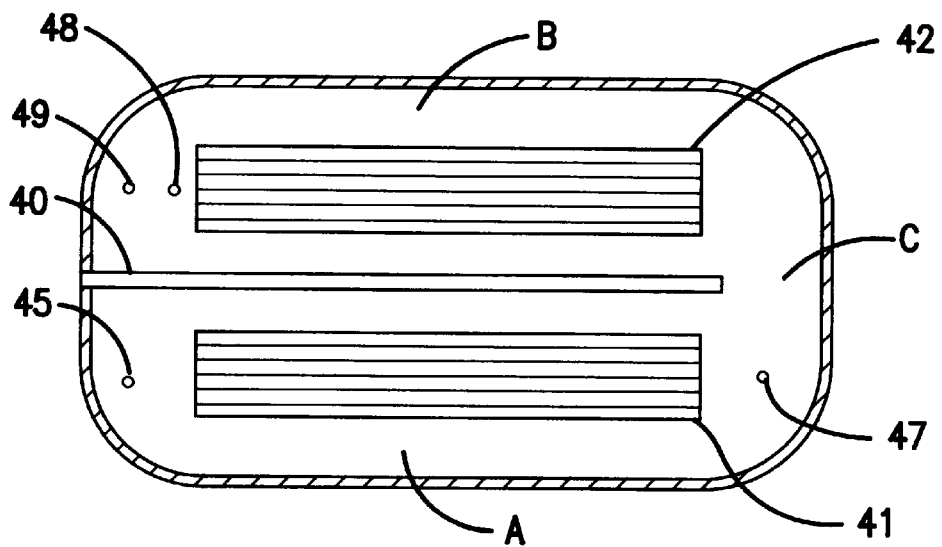

In connection with FIG. 1 (block diagram of the system) and FIG. 2 (vertical and horizontal sections of the multi-functional intermediate container) an embodiment of the system and the devices being part of it are described below:

Char, suitably with an average particle size of 50–100 $\mu$m and with preferably high temperature, is fed via a flow controlling unit, e.g. a sector feeder and an equalizing screw, to the partial combustion reactor 1, suitably being of venturi type. In the reactor 1 a bubbling (spouting) fluidized bed is maintained by feeding to the bottom of the reactor 1 a suspension of recirculated bed material and air at greater than 500° C., preferably about 600° C.

The suspension is obtained by mixing of controlled flows of hot bed material from the intermediate container 4 and air from the system's gas turbine compressor 62, the pressure of which has been rised in a booster 64 to compensate for the pressure losses of the system.

The multi-functional intermediate container 4 suitably has, with consideration to the prevailing pressure in the system, the shape of a lying cylinder. This has preferably a built-in vertical partition wall 40 starting from one of the cylinder heads (gables), which wall divides the cylinder space in two parallel longitudinal compartments, A and B, respectively, with a connecting compartment C near the opposite head, originating from the fact that the partition wall does not reach this head. The bed material from the gas cleaning unit 31/32, having a temperature of about 850° C., is via drop legs 45 fed to compartment A near the first mentioned head and is during the passage through the container kept in motion by fluidization with a small flow of air 46 with outlet 43. Tapping from the container is done, partly via an overflow 47 in the connecting compartment C through which the main part of the bed material flow is tapped, partly via a flow controlled outlet 48 opening below the bed surface in compartment B near the first mentioned head. In order to control the inventory of bed material in the system a controlled flow thereof is tapped through another outlet 49 in compartment B< suitably on the same level as the overflow in compartment C, via a flow controlling unit, e.g. a sector feeder. The flow is adapted corresponding to the material flow entering the system as char ash and sorbent material.

The intermediate container 4 can also have a vertical partition wall dividing the cylinder space crosswise in the two compartments A and B, whereby the wall is constructed so that a connection exists between the compartments as well in the gas as in the fluid phase. The overflow of this variant is arranged in that part of compartment A, which borders on the partition wall, while the flow controlled outlet is arranged in that part of compartment B, which borders on the cylinder head there.

In the fluid phase of each of the compartments A and B a heat exchanger 41/42 is installed, which preferably is used for over-reheating of steam from the system's steam generator to its steam turbine. The bed material flow through the outlet 47 in the connecting compartment C has, owing to influence of heat exchanger 41 in compartment A< a lower temperature than the bed material flow from the gas cleaning unit 31/32 to the intermediate container 4. The bed material tapped via the flow controlled outlet 48 in compartment B has, owing to influence of the heat exchanger 42 installed in this compartment a still lower temperature. The lowering of the temperature of the bed material, when passing respective compartments, will depend on the structure of the system's steam cycle.

The air flow from the booster 64 is split into two partial flows, one smaller corresponding to 60–70% of the theoretical combustion air ratio of the char and one larger flow equivalent to the rest of the flow from the booster. The ratio between the two flows is about 1:8.6 in the embodiment described here.

The smaller air flow 65 is mixed with the controlled flow of bed material from the outlet 48 opening below the bed surface in the intermediate container's compartment B< whereby the flow is controlled in such a way, that the formed suspension gets a temperature of greater than 500° C., preferably about 600° C. A suitable device for the flow control is among others a so-called "N-valve". The mixing is done by direct feeding 66 the bed material flow into the air transport pipe line from the booster 64 and the suspension formed, with a ratio of bed material/air of about 6.9:1, is fed into the venturi reactor of the partial combustion reactor 1, where the temperature increases to greater than 750° C., preferably 800–850° C. The larger air flow 66 from the booster 64 is mixed directly in the transport pipeline with the bed material flow from the overflow 47 in the intermediate container's connecting compartment C, whereby the temperature of the formed suspension is controlled to greater than 500° C., preferably about 600° C., by maintaining an adapted bed material inventory in the system. The formed suspension, with, in this embodiment, a bed material/air ratio of about 2.2:1, is fed into the final combustor 2 for the final combustion step. The final combustor may be constructed as a fluidized transport reactor with for example a conical bottom, into which the suspension from the venturi reactor of the partial combustion step also is fed.

In the final combustion step 2 unburnt material from the partial combustion step 1 is combusted at about 850° C., the ideal temperature for fixation to the sorbent of sulphur dioxide formed by the combustion. Hereby produced solid products hold, besides ash constituents from the original coal fluid, unreacted excess sorbent, by the sulphur fixation formed gypsum and possibly added sand or equivalent material. This mixture is in all what in this description has designated as bed material.

High burn out in the final combustion step 2 is reached by constructing the same as a fluidized transport bed with such dimensions that the dwell time for bed material there is greater than 5 seconds, preferably 7–10 seconds. This implies that the fluidized reactor suitably is given a proportionately large length/diameter ratio (suitably greater than 4, preferably 5–10) in order to, with a simple reactor bottom design, reach reasonable velocity distribution over the cross-section of the reactor.

The suspension of bed material and flue gases leaving the top of the fluidized bed transport reactor is fed to a gas cleaning unit 31/32 with suitably two cleaning steps: a first cyclone step 31 with one or several in series connected cyclones, optionally in one or several parallel trains, and a second final cleaning step with one, optionally several in parallel connected, filter unit(s) with ceramic filter elements. The resistance of the filter elements is suitably controlled by periodical back blowing with compressed air. Bed material separated in the gas cleaning unit is fed to compartment A of the intermediate container 4 through drop legs 45 opening below the surface of the fluid in vicinity of the head.

The gas from the gas cleaning unit 31/32 is free from dust and contain in this embodiment about 6.3% $CO_2$, 14.7% $O_2$, 79% $N_2$ and less than 0.5% $H_2O$ and is fed to the combuster 61 of the gas turbine, where the temperature of the gas is increased to 900–1300° C. (depending on type of gas turbine) through feeding, for instance, fuel gas to the combuster, preferably pyrogas from a gas generator according to patent SE-9200989-3.

The heat content of the flue gases from the system's gas turbine 63 with a temperature of 400–600° C. is utilized in a steam generator 7 of conventional design for generation of preferably saturated steam with a high pressure, suitably greater than 90 bars, preferably 150–200 bars. The system's steam turbine 51/52 with condenser 53 is suitably built with separate high and low pressure sections and for an admission temperature of greater than 500° C., preferably 530–555° C., and reheating of the steam leaving the high pressure section to the same temperature. Superheating and preheating, respectively, are accomplished din the heat exchangers 41/42 mounted in the intermediate container 4, the surfaces of the exchangers being small compared to normal superheater surfaces owing to the very high heat transfer coefficient (about 500 $kcal/m^2.h.$ ° C.) between the fluidizing bed material in the container and the heat exchanger surfaces.

In the case of the system according to the invention being part of a larger integrated balanced system for power generation based on, for example, a sub-bituminous coal with high content of volatile components (brown coal etc.), where the coal is split in high calorific pyrogas and char according to SE-9200989-3, only a minor part of the pyrogas flow is needed for "topping" of the flue gases from the final combustion step 2 in the combustor ahead of the gas turbine. The rest of the pyrogas flow is then most advantageously utilized in a separate gas turbine, whereby the energy content of the flue gases from thee same is suitably utilized in a steam generator common to the gas turbine of the system according to the invention and the separate gas turbine. Such an integrated system with two gas turbines will be more flexible and more easily run and will enable the choice of a gas turbine type with higher admission pressure (i.e., higher efficiency) for the separate gas turbine without effecting the pressure level of the system according to the invention. It is, however, possible in an integrated system to have only one larger gas turbine and tap the air to the combustion steps of the system according to the invention from said turbine's compressor.

Power generation based on sub-bituminous coal in a combination of systems with pyrogas generation according to SE-9200989-3 and char utilization according to the present invention results, by choice of suitable types of gas and steam turbines, in very high total efficiency coal/electricity or greater than 46%.

I claim:

1. A process for power generation by pressurized combustion of char at overatmospheric pressure in a system comprising a combined cycle with gas and steam turbines, comprising the steps of:

partial combusting of the char in a first step at 750–850° C. with air preheated to above a temperature of 500° C. in a bubbling fluidized bed in the presence of recirculating bed material comprising char ash and sorbent reaction products in a flow exceeding 20 times the char flow;

final combusting in a second step at about 850° C., with a large excess of air corresponding to more than 3 times the theoretical combustion air ratio, of unburned char from said first step and carbon monoxide formed in said first step with air preheated to above 500° C., in the presence of a bed material flow exceeding 40 times the flow of char;

separating, at high temperature, of bed material and gas in a suspension resulting from said final combusting step in a gas cleaning unit to deliver separated solid material to an intermediate container and to deliver cleaned gas to a combuster located before a first gas turbine of the system;

recirculating bed material from the gas cleaning unit to be used in the aforementioned combustion steps via an intermediate container where an adapted cooling of the material is performed by heat exchangers, and splitting the material flow into two partial flows;

subsequent to splitting pressurized air flow into two partial flows from a gas turbine compressor, preheating of the pressurized air flow to above 500° C. by mixing partial flows of hot bed material withdrawn from the intermediate container into the respective two partial flows of the pressurized air from the gas turbine compressor;

generating electric power in a combined cycle with the first gas turbine and a steam turbine, after the gas from the gas cleaning unit is combusted in a gas turbine topping cycle, wherein the steam turbine is part of a steam cycle with high steam pressure and superheating to a high temperature occurs in the heat exchangers of the intermediate container; and recovering heat energy in flue gases from the gas turbine of the system in a steam generator and utilizing the steam in the steam cycle of the system.

2. A process according to claim 1, wherein the final combusting step is performed in a fluidized reactor of a transport type with dimensions so selected that a dwell time of the bed material in the reactor is more than 5 seconds, and that the length/diameter ratio of the reactor is more than 4.

3. A process according to claim 1, wherein the material is separated from the suspension resulting from the final combusting step via droplegs and fed to the intermediate container which has the shape of a lying cylinder provided with a vertical partition wall starting from one of two cylinder heads, dividing a cylinder space into two longitudinal compartments, A and B, respectively, with a connecting compartment C near an opposite head wherein the partition wall does not extend to the opposite head, wherein the droplegs open into compartment A near the first mentioned cylinder head and below a fluid surface which is formed when the bed material passing through the container is fluidized with an adapted small flow of air, the compartment being designed and constructed so that bed material is tapped from the container, partly via an overflow in compartment C and partly via a flow controlled outlet below the fluid surface in compartment B near the first mentioned head, and wherein a bed material inventory of the system is controlled by adapted tapping at a level of the overflow and in a vicinity of the flow controlled outlet in compartment B, of a bed material flow corresponding to the char ash supplied to the system and the sorbent reaction products formed in the system.

4. A process according to claim 3, which comprises the further step of preheating of combustion air for said partial and final combusting steps, by air from the gas turbine compressor of the system, after adapted pressure increase in order to compensate for pressure losses of the system, being split into two partial flows, a smaller flow corresponding to 60–70% of the char flow theoretical combustion air ratio and a larger flow equivalent to the remainder;

the smaller partial flow being mixed with bed material tapped through the outlet of the intermediate container compartment B with such a controlled flow that the obtained suspension reaches a temperature of above 500° C.;

the obtained suspension being fed to a venturi reactor of said partial combusting step;

the larger partial flow being mixed with the bed material flow leaving via the overflow in the intermediate container connecting compartment C;

giving the obtained suspension a temperature of above 500° C. by maintaining an adapted bed material inventory; and feeding the suspension into the transport reactor in said final combustion step.

5. A process according to claim 1, wherein said generating electric power step utilizes the steam turbine having a high and a low pressure section, with admission of steam pressure at above 90 bars;

and further comprising the step of superheating and preheating the steam to above 500° C. in heat exchangers installed in compartments A and B of the intermediate container.

6. A process according to claim 1, further comprising the steps of utilizing coal split into pyrogas and char;

utilizing a second gas turbine for power generation fed by excess pyrogas, and providing the two gas turbines with a common steam generator.

7. A process according to claim 6, comprising the further step of operating the second gas turbine at a higher admission pressure than the first gas turbine.

8. A plant for carrying out power generation based on pressurized combustion of char at overatmospheric pressure in a combined cycle with gas and steam turbines, the plant comprising:

a partial combusting means for partial combustion of the char at 750–850° C. with air preheated to above 500° C. in a bubbling fluidized bed in the presence of recirculating bed material in a flow exceeding 20 times the char flow;

a final combusting means for final combustion, with a large excess of air, of unburned char from said partial combusting means and carbon monoxide formed in said partial combusting means at about 850° C. with air preheated to above 500° C. in the presence of a bed material flow of higher than 40 times the flow of char;

a separating means for separation, at high temperature, of bed material and gas in a suspension resulting from said final combustion means, said separating means comprising a gas cleaning unit adapted to deliver separated solid material to an intermediate container, and a cleaned gas to a combuster operatively located before a first gas turbine of the system;

a recirculation means for recirculation to said partial and final combustion means of bed material from said separating means via said intermediate container, said recirculation means comprising heat exchangers for an adapted cooling of the material and a splitting means for splitting the material flow into two partial flows;

a preheating means for preheating to a temperature of above 500° C. a pressurized air flow from a gas turbine compressor of the system, the pressurized air flow having been split into two partial flows, said preheating means adapted for mixing partial flows of hot bed material withdrawn from the intermediate container into the respective partial flow of the pressurized air flow from the gas turbine compressor;

a power generating means for electric power generation in a combined cycle with the gas turbine and a steam turbine, after the gas from the gas cleaning unit is combusted in a gas turbine topping cycle, wherein the steam turbine is part of a steam cycle with high steam pressure and superheating to a high temperature being designed to occur in the heat exchangers of the intermediate container; and a recovery means for recovery of heat energy in the flue gases from the gas turbine of the system in a steam generator and utilization of the steam in the steam cycle of the system.

9. A plant according to claim 8, wherein the final combusting means comprises a fluidized bed reactor of the transport type with dimensions so selected that a dwell time of the bed material in the reactor is more than 5 seconds, and that a length/diameter ratio of the reactor is above 4.

10. A plant according to claim 8, wherein said separating means for separation of bed material from the suspension leaving the final combusting means and recirculation of material separated in the gas cleaning unit, further comprises droplegs for feeding the separated material to the intermediate container, said intermediate container being in the shape of a lying cylinder provided with a vertical partition wall starting from one of two cylinder heads dividing a cylinder apace in two longitudinal compartments, A and B, respectively, with a connecting compartment C near an opposite head, wherein the partition wall does not extend to said opposite head, wherein the droplegs open into the compartment A near the first mentioned container head and below a fluid surface formed when the bed material passing through the container is fluidized with an adapted small flow of air, and wherein the container is adapted to permit the bed material to be tapped from the container, partly via an overflow in compartment C and partly via a flow controlled output below the fluid surface in compartment B near the first mentioned head.

11. A plant according to claim 10, further comprising a preheat means for preheating of the combustion air to said partial and final combusting means, said preheating means comprising a pressure means for giving discharge air from the gas turbine compressor of the system an adapted pressure increase in order to compensate for pressure losses of the system, a splitting means for subsequent splitting said air into two partial flows, a smaller flow corresponding to 60–70% of the char flow's theoretical combustion air ratio, and a larger flow equivalent to the rest of the discharge air, a first mixing means for mixing the smaller partial flow with the bed material tapped through the outlet in compartment B of the intermediate container, a first feeding means for subsequent feeding of the suspension into the reactor of the partial combusting means, a second mixing means for mixing the larger partial flow with the bed material flow leaving via an overflow in the intermediate containers connecting compartment C, and a second feeding means for subsequent feeding of the suspension to the transport reactor of the final combusting means.

12. A plant according to claim 8, wherein the steam turbine of the combined cycle comprises a high as well as a low pressure section, and wherein the intermediate container further comprises heat exchangers installed in compartments A and B, respectively for superheating and preheating, respectively, steam to a temperature above 500° C. for supply to said steam turbine.

13. A plant according to claim 8, further comprising a second gas turbine for power generation and adapted to utilize excess pyrogas fed to but not consumed in the topping cycle, wherein the two gas turbines of the system have one common steam generator.

14. A plant according to claim 8, wherein said intermediate container comprises a shape of a lying cylinder with ceramic lining and a built-in vertical partition wall starting from one of two cylinder heads, which wall divides a cylinder space into two longitudinal compartments A and B, respectively, with a connecting compartment C near an opposite head, the wall not extending to the opposite head, the compartments A, B and C having one inlet, two overflows and a flow controlled outlet for bed material circulating in the system, the compartments A, B and C having plural inlets at a bottom level adapted for a small flow of air to be fed into the fluidized bed material in order to keep the same fluidizing, with an air outlet being in a gas containing part of the cylinder space, and heat exchangers being installed in a fluid containing part of compartments A and B, respectively.

* * * * *